United States Patent [19]

Rosebrock

[11] 4,054,417

[45] Oct. 18, 1977

[54] REGENERATIVE-FILTER-INCINERATOR DEVICE

[75] Inventor: Theodore L. Rosebrock, Rochester, Mich.

[73] Assignee: General Motors Corporation, Detroit, Mich.

[21] Appl. No.: 753,722

[22] Filed: Dec. 23, 1976

[51] Int. Cl.[2] .............................. F01N 3/15; B01J 8/10

[52] U.S. Cl. .............................. 23/277 C; 23/288 FC; 23/288 E; 165/8; 60/902; 55/DIG. 30; 55/285; 110/8 A

[58] Field of Search .................. 23/277 C, 284, 288 F, 23/288 FC; 165/5, 6, 8; 60/902; 55/390, 285; 210/325; 110/8 A

[56] References Cited

U.S. PATENT DOCUMENTS

| | | | |
|---|---|---|---|
| 3,404,965 | 10/1968 | Shiller | 23/277 C |
| 3,607,133 | 9/1971 | Hirso | 23/288 F |
| 3,615,248 | 10/1971 | Holler, Jr. | 23/277 C |

*Primary Examiner*—James H. Tayman, Jr.
*Attorney, Agent, or Firm*—Arthur N. Krein

[57] ABSTRACT

A regenerative-filter-incinerator device, for use in the exhaust system of an internal combustion engine of the diesel type, includes a drum-like regenerative-heat exchanger-filter assembly rotatably mounted within a housing that is adapted to be installed directly in the exhaust gas stream discharged from a diesel engine as close to the engine as possible, the regenerative-heat exchanger-filter assembly provides an inner chamber which serves as a reaction chamber for the secondary combustion of exhaust gases including particulates discharged from the engine. The regenerative-heat exchanger-filter assembly includes a plurality of separately rotatable heat exchange-filter elements pervious to radial flow of fluid therethrough and adapted to filter out particulates from the exhaust gases and to carry them into the reaction chamber. During engine operation, the reaction chamber is provided with a quantity of heat, as necessary, to effect secondary combustion of the exhaust gases and particulates by means of an auxiliary heat source and the heat generated within the reaction chamber is stored in the individual heat exchange-filter elements during the discharge of exhaust gases therethrough from the reaction chamber and this heat is then transferred to the inflowing volume of the exhaust gases so that, in effect, exhaust gas is discharged from the device at substantially the same temperature as it was during its inlet into the device from the engine.

4 Claims, 2 Drawing Figures

REGENERATIVE-FILTER-INCINERATOR DEVICE

Figure 1:
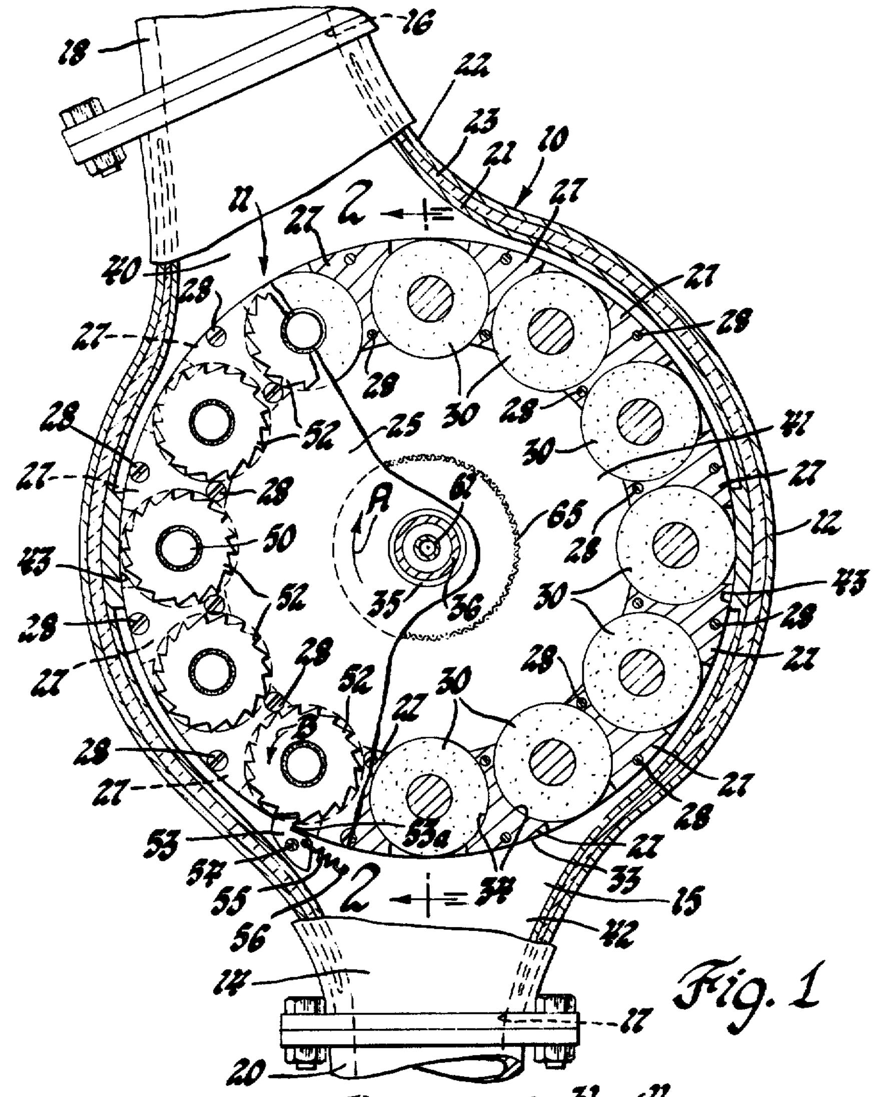

This invention relates generally to an emission control device for use in the exhaust system of an internal combustion engine and, in particular, to a regenerative-filter-incinerator device for use in the exhaust system of a diesel engine.

As is well known in the art, it is now common to use either an air injection reactor system or a converter, or both, in the exhaust system of an internal combustion engine in order to reduce the discharge to the atmosphere of certain combustion byproducts from the engine. Such emission control devices have been effectively used with internal combustion engines of the spark ignition type.

However, such art emission control devices, as previously known, would not be nearly as effective if used with diesel engines since the exhaust gases discharged from diesel engines include, in addition to combustible hydrocarbons, carbonaceous particulates in the form of soot particles which can only be incinerated at relatively high temperatures. This soot which occurs as black smoke from low pollution diesel engines consists of amorphous carbon in the form of very finely divided graphite. Although individual soot particles may be very small, they will combine together into loose soot coagulates as a function of pressure and temperature. The quantities of soot forming during the combustion process in a diesel engine depend on a large number of variables, such as start of fuel injection, the fuel injection process, the course of fuel-mixture, as well as on the nature of the combustion process (precombustion chamber, vortex chamber, direct injection), on the engine revolutions and, especially on the engine load.

In an article entitled "Soot Reduction in Diesel Engines by Afterburning. Soot Composition and Instrumental Determination" by N. Metz and W. Muller, published by the Committee on the Challenges of Modern Society 2nd Symposium on Low Pollution Power Systems Developement, held at Dusseldorf, Germany on November 4 – 8, 1974, it was proposed that, in principle, pure retention and afterburning systems, as well as their combination, are possibilities for a reduction of the soot formed during diesel engine combustion. However, in this article, it was pointed out that in pure filtration of the soot particles, the main problem consists of the relatively large quantity of soot produced from a diesel engine and the small particle size of less than 0.1 micro meter of the main volume of soot since the useful separation efficiency can only be obtained by the use of filters having a very small pore size. Obviously, with the feasible filter dimensions possible for use in a conventional size motor vehicle, this would result in limited filter soot separation and result in a high pressure loss as the filter material becomes contaminated.

The soot which is suspended in the exhaust gases discharged from the engine can also be continuously afterburned in a thermal reactor, but would require a relatively long residence time in the reactor with temperatures in the reactor maintained at a value considerably above the temperature of the exhaust gas as discharged from the engine. Obviously, this would require a continuous heat supply to maintain the desired high temperature in the thermal reactor and, in accordance with the prior art thermal reactors, this could only be maintained by means of higher fuel consumption for the entire engine package.

To solve the above problems, it has been proposed, as disclosed in the above-identified article that afterburning could be effected by means of a regenerator-reactor-hot filter device which would include a drum-like rotating regenerative-heat exchanger, the inner chamber of which would serve as a reaction vessel that would be supplied with additional heat to bring the exhaust gases up to a desired reaction temperature with this heat being supplied in a known manner, for example, by an electrical heater coil or by the introduction of additional air and fuel into the reaction chamber with ignition thereof, if necessary, being effected by electrical spark discharge devices, in a manner known in the art.

It is therefore a primary object of this invention to provide an improved regenerative-filter-incinerator device wherein a plurality of heat exchange-filter elements are utilized to efficiently remove particulates from the exhaust gases discharged from a diesel engine and to retain these particulates to convey them into a thermal reactor for incineration of these particulates.

Another object of this invention is to provide an improved regenerative-filter-incinerator device having means to recover thermal energy from the exhaust gases discharged from a thermal reaction chamber of the device and to add this thermal energy thus recovered to the exhaust gases ready to be admitted into the reaction chamber of the device in order to minimize the net energy requirement of the device.

A still further object of the present invention is to provide in a regenerative-filter-incinerator device means to change periodically the flow portion of the heat exchange-filter elements in the device to present a clean filtering surface for the removal of particulates while, at the same time, delivering filter particulates into the reaction chamber of such a device for incineration of these particulates whereby to prevent clogging of the heat exchange-filter elements due to particulate accumulation thereon.

These and other objects of the invention are obtained by means of a regenerative-filter-incinerator device, for use in the exhaust system of an internal combustion engine, which includes a drum-shaped housing which encloses a hollow drum-like cage assembly that is rotatably supported in the housing, the cage assembly rotatably supporting a plurality of filter elements made of heat exchange material that are porous to fluid flow radially therethrough, the cage with its filter elements form with and divide the housing into an inlet flow path for the exhaust gases received from the engine, an outlet flow path for the discharge of exhaust gases from the housing and, an intermediate thermal reactor chamber within the cage assembly that is in fluid communication with the inlet flow path and the outlet flow path by the flow of fluid radially through the filter elements on one side of the cage assembly and then from the thermal reactor chamber radially out the filter elements on the opposite side whereby heat generated within the thermal reactor chamber is given up to these filter elements so that, when they are rotated to the inlet side of the housing, they will give up heat to the incoming exhaust gases and, drive means associated with each of the heat elements whereby they are rotated at a predetermined speed so as to convey particles deposited thereon from the incoming exhaust gases into the thermal reactor chamber for combustion therein thereby cleaning the surface of the filter elements so that this thus cleaned surface can later be exposed to the incoming exhaust gases.

Figure 2:
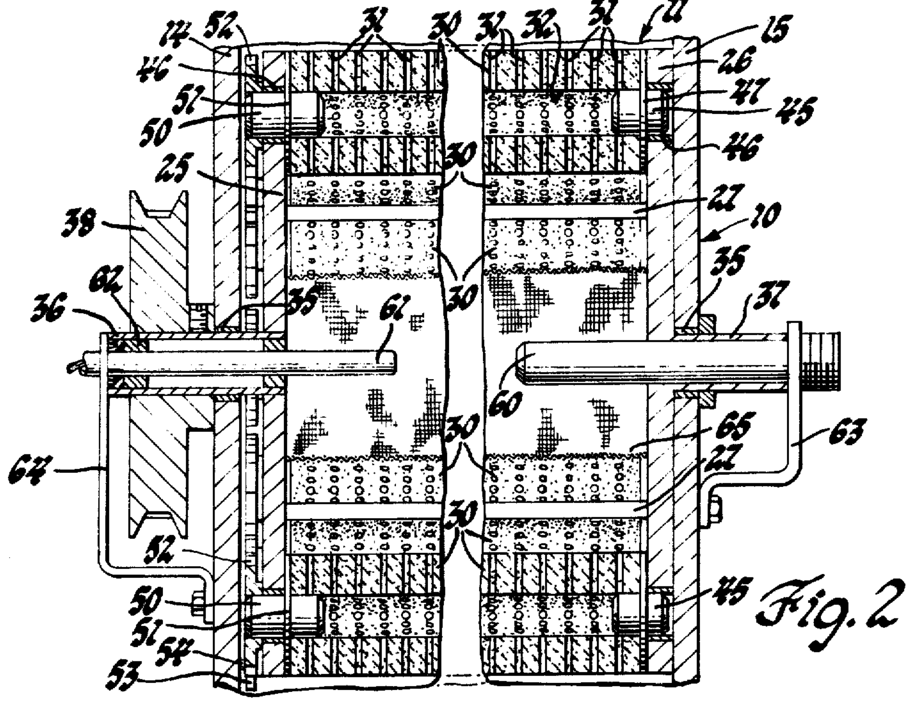

For a better understanding of the invention, as well as other objects and further features thereof, reference is had to the following detailed description of the invention to be read in connection with the accompanying drawings, wherein:

FIG. 1 is an end elevational view of a regenerative-filter-incinerator device in accordance with the invention, with parts of the device broken away to show the internal construction of the device; and, FIG. 2 is a sectional view of the regenerative-filter-incinerator device of FIG. 1 taken along line 2—2 of FIG. 1.

Referring now to the drwings, the regenerative-filter-incinerator device, in accordance with the invention, includes a housing 10 which is generally drum-shaped and which encloses an annular cage and heat exchange-filter elements assembly, hereinafter referred to as a cage assembly, generally designated 11, which is mounted for rotation about an axis of rotation, in a manner to be described.

As shown, the housing 10 includes an outer casing 12 and spaced apart, parallel, side end plates 14 and 15 suitably secured together into a unitary structure. The housing 10 is provided with a flanged inlet 16 and a flanged outlet 17 whereby the device can be fixed into the exhaust system of a diesel engine, with the device positioned as close to the engine as physically possible, for example, as by having the flanged inlet 16 connected to the flanged manifold outlet 18 of the engine exhaust manifold, while the flanged outlet 17 would, of course, be connected to the normal exhaust pipe 20 or to a muffler, not shown, if desired.

To prevent heat losses, the casing 12 is preferably of the insulated type and thus would include inner and outer casing portions 21 and 22, respectively, suitably secured together with an insulating material 23 sandwiched therebetween. As previously mentioned, the exhaust connections from the engine, not shown, should be as short as possible in order to minimize thermal losses and consignment temperature drop between the engine and the device 10.

Referring now to the annular cage assembly 11, it includes a cage consisting of a pair of circular, disk-shaped cage end plates 25 and 26 held in spaced apart parallel relation to each other by a plurality of longitudinal, rigid spacer elements which, in the embodiment illustrated, preferably take the form of seal or cage segments 27, to be described in more detail hereinafter, suitably secured to the end plates near the outer peripheral edges of these end plates 25 and 26 in equally spaced apart, parallel relationship to each other. For example, the seal or cage segments 27, hereinafter referred to as seal segments, can be cast integral with the end plate 26 and, the end plate 25 can then be fixed to these seal or cage segments as by the use of machine screws 28.

Positioned between each set of opposed seal segments 27 is a filter element 30, each such filter element 30 extending substantially the full longitudinal distance between the end plates 25 and 26. Each such filter element is made of a suitable refractory, heat exchange matrix material and is of a structure defining pores or passages 31, shown grossly exaggerated in size in FIG. 2, extending substantially in a transverse direction from face to face of each filter element. Although the configuration of a filter element 30, when viewed in transverse cross section may be of any desired shape, preferably and as illustrated in the construction shown, it is of circular configuration for a purpose which will become apparent. In addition, each filter element 30 may be a solid structure, that is, with the material thereof extending across the entire transverse area of the element or, as shown, it may be of tubular construction with a hollow core 32, also for a purpose which will become apparent.

The material, from which the filter elements 30 are made, can be of any suitable material that is adapted to withstand the high temperatures encountered during the operation of the device 10 and is operative as a heat exchange material. For example, the filter elements can be made of any of the known materials used in the recuperative or generator heat exchange art of the type used, for example, in gas turbine engines, or the material may be of the type used in the monolith catalytic converter art for the construction of catalytic converters as presently used in automotive vehicles. Thus, for example, this material may be of the type described in U.S. Pat. No. 3,533,753 entitled "Catalyst for Engine Exhaust-Gas Reformation", issued Oct. 13, 1970 to Heinz Berger. Another suitable material for fabricating the filter elements 30 may be a fluid permeable refractory structure of the type disclosed in U.S. Pat. No. 3,949,109 entitled "Support Structures for Fixed Bed Flow Reactors", issued Apr. 6, 1976 to John Joseph McBride. In addition, as is well known is the catalytic converter art, the material of the filter elements 30 may contain or be comprised of catalytic materials to promote combustion of captured particulates and gaseous hydrocarbons, as may be necessary, for use with a particular engine. These catalytic materials are well known and thus need not be described in detail herein.

In addition, although the filter elements 30, in the construction shown, are illustrated as being made of the same material, it should be realized that they can be fabricated as a composite structure. Thus, for example, each filter element 30 could be fabricated with an inner core of a material highly suitable as a heat exchange material as, for example, a corrugated stainless steel heat exchange matrix structure of the type known in the heat exchange regenerator art and with an outer sleeve over the core of a suitable filter material to serve primarily as the filtering means only for this element. With such an arrangement, full advantage can be made of the filtering properties of one material and the high heat exchange properties of a second material.

When using a filter element 30 of cylindrical or tubular configuration, as shown, it is only necessary that the pores or passages 31 through the material of the filter element be orientated so that the flow therethrough is substantially in a radial or transverse direction and that the size of the pores or passages be sufficiently small so that at least the material of the filter element, adjacent to the outer periphery of each element, be of a size so as to filter out and trap the particulates from the exhaust gases discharged from the engine while still not causing a substantial pressure drop across each filter element. Although in FIG. 2 the pores or passages 31 are shown as straight, radial passages, it should be realized that these can be inclined relative to the longitudinal axis of the filter element or they can be of helical configuration, it only being necessary that the flow through the element be in a substantially radial or transverse direction, for a purpose which will become apparent.

Again referring to the seal or cage element 27, as will be apparent, these elements are made of a material impermeable to fluid flow and, in the construction shown, are formed with an outer arcuate surface 33 conforming to the outer periphery of the end plates 25 and 26 and are positioned so that these surfaces are in alignment therewith. In addition, each of these seal segments 27 is provided with semi-circular recessed seal surfaces 34 conforming to the outer periphery of the filter elements 30. The seal segments 27 and the filter elements 30 are so positioned with respect to each other that the seal segments separate and have low clearance with the element 30 so as to substantially prevent radial flow through the cage assembly 11, except through the filter elements 30.

To effect operation of the filter elements 30 as a regenerator, the cage assembly 11 is mounted in the housing 10 and supported therein for rotation about an axis. For this purpose in the construction illustrated, each of the end plates 14 and 15 is provided with a central aperture having a suitable bearing 35 positioned therein, as for example by a press fit. In addition, each of the cage end plates 25 and 26 is provided with a stub shaft 36 and 37, respectively, fixed thereto to extend outward therefrom, as by welding or, as shown, by being formed integral with the respective cage end plate. The stub shafts 36 and 37 are positioned so as to be journaled by the bearings 35 in the end plates 14 and 15, respectively, whereby the entire cage assembly is supported for rotation about the axes of these shafts.

Suitable means, such as gear tooth pulley 38 fixed to stub shaft 36, is provided whereby the cage assembly 11 can be rotated at a predetermined speed as driven by the engine, not shown, in a conventional manner, or an exhaust gas driven turbine, not shown, or an electric motor, not shown, through a speed reducer, not shown, if necessary, all in a manner well known in the art.

With this arrangement, the cage assembly 11 is concentrically mounted for rotation within the drum-shaped housing 10 and forms with it an inlet flow path 40, an intermediate thermal reaction chamber 41 within the cage assembly 11 and a discharge flow path 42. As shown, the inlet flow path 40 and the discharge flow path 42 are separated from each other by arcuate seal surfaces 43 fixed to or, as shown, formed integral with the inner casing portion 21 of the housing 10 and positioned diametrically opposite each other. The seal surfaces 43 have low clearance with the cage segments 27 and are of a length so as to span the gap between adjacent cage elements and thus will operate to separate the annular clearance between the housing and the cage assembly 11 to the above described inlet and outlet flow paths and thus prevent flow from bypassing the filter elements 30.

In order to prevent excessive particulate build-up on each of the filter elements 30 and to permit the burning of this particulate matter within the thermal reaction chamber 41, each filter element 30 is rotatably supported in the cage assembly 11 and is caused to rotate by a suitable drive arrangement about its respective axis of rotation at a lower rotative speed than that of the cage assembly 11.

For this purpose, in the construction illustrated, each filter element is rotatably supported by a suitable stub shaft. Thus as shown, with reference to FIG. 2, the right-hand end of each filter element 30 is rotatably supported relative to the end plate 26 as by means of a stub shaft 45, one end of which extends into a bearing aperture 46 in the end plate 26 while its opposite end extends into the core 32 of a filter element, as by a press fit, whereby this end of the filter element is fixed to the stub shaft for rotation therewith. In the embodiment shown, the stub shaft 45 is provided with a radial bearing flange 47 intermediate its ends with one side of this bearing flange abutting against the end of the filter element 30 and its other end being, in effect, in a thrust bearing relationship with the inner face of the end wall 26. At its other end, each filter element 30 is rotatably supported by a similar stub shaft 50 with one end of this stub shaft extending through a bearing aperture 46 in the end plate 25 and its opposite end extending into the core 32 of the filter element as by a press fit, whereby the core element is in driven engagement with this stub shaft. The stub shaft 50 is also provided intermediate its ends with a radial flange 51 which serves as, in effect, a thrust bearing between the left-hand end of the filter element and the inner face of the end plate 25.

Although any suitable means can be used to effect rotation of the filter element 30, in the embodiment shown, a slow stepped rotation of the filter elements is effected by mounting a ratchet wheel 52 to each of the stub shafts 50 adjacent to the outboard face of the end plate 25, the stub shaft 50, of course, being of an axial length so that one end thereof is of a length to extend through the end wall 25 a sufficient distance whereby the ratchet wheel can be fixed to it for rotation therewith. In the construction shown, a single pawl 53 is pivotally mounted intermediate its ends by means of a pin 54 to the end plate 14 on the side thereof in a position whereby its ratchet tooth engaging end 53*a* can be positioned for engagement with a tooth of each ratchet wheel 52 during rotation of the cage assembly in the direction indicated by the arrow A in FIG. 1, that is, in a clockwise direction as shown. The pawl 53 is releasably biased into engagement with a ratchet wheel 52 by means of a coiled spring 55 hooked at one end through a suitable aperture in the pawl 53 and secured as by a pin 56 to the end plate 14.

In the construction illustrated in FIG. 1, it will be apparent that if the cage assembly 11 is rotated in a clockwise direction, with reference to this FIGURE, each filter element 30 will be step rotated in a counterclockwise direction, as indicated in this FIGURE by the arrow B. It will thus be apparent that, as the cage assembly is rotated, each filter element will be sequentially rotated a small increment during each rotative cycle of the cage assembly 11.

Although, in the particular construction shown, there is a substantial air gap between the end plates 14 and 25 because of the positioning of the ratchet wheels 52 outboard of the cage end plate 25, which gap would permit some exhaust gases to bypass the thermal reactor chamber 41, this bypass of exhaust gases would be relatively insignificant in relation to the total exhaust flow and would, therefore, not adversely affect the overall operation of the subject exhaust emission control device.

However, it should be readily realized by those skilled in the art that, by reducing the diameter of the ratchet wheels 52 and by relocation of the pawl 53, either the end plate 14 or the cage end plate 25, or both, could be provided with annular recesses whereby these elements would be substantially enclosed so that a low clearance could be established between the opposing faces of the end plate 14 and the cage end plate 25 to thus severely restrict bypassing flow of exhaust gases around the cage assembly.

In order to at least initially heat the exhaust gases flowing into the thermal reactor chamber 41 to a higher temperature sufficient to effect secondary combustion of the exhaust gases and to effect incineration of the particulates carried into this chamber by the filter elements 30, an auxiliary heater is suitably mounted so as to provide heat within the thermal reactor chamber 41. The heater to effect this may be either electric or it may be an oil or gas burner with any of several known types of fuel injection systems associated therewith, and means being provided to ignite the gases, for example, such as by means of a sprak plug, glow plug, or catalytic ignition. In addition, a temperature sensor would be mounted to sense the maximum gas temperature or maximum filter element temperature which is then used to control or regulate the heater output in response to the temperature signal.

In the construction illustrated, this is accomplished by having the stub shaft 36 and the stub shaft 37 each provided with a bore therethrough, that is, each such stub shaft is of hollow tubular configuration, as shown. With this arrangement, for example, a heater element in the form of an electric resistance element 60 can be inserted through the stub shaft 37 so as to project into the thermal reactor chamber 41, this element, of course, being suitably fixed as by a bracket 63 to prevent rotation thereof and to maintain its axial position relative to the stub shaft 37. In a like manner, a temperature sensor in the form, for example, of a thermostat switch 61 is inserted through the stub shaft 36 and it is suitably supported therein, as by means of bearing supports 62. As with the heating element 60, the thermostat switch 61 is also suitably fixed by a bracket 64, to prevent its rotation and to limit its axial movement relative to the stub shaft 36 so that the probe end of this switch is suitably positioned within the thermal reactor chamber 41. Preferably, an annular screen 65 is positioned within the thermal reactor chamber 41, as by having one end thereof welded to the inboard face of the cage end plate 25, in position to encircle the heater element 60 as an aid in obtaining even distribution of heat along the axis of rotation of the cage assembly 11.

It will be readily apparent to those skilled in the art that, if an electric heater, such as heater element 60, is used to supply the additional heat to the thermal reaction chamber 41, this element would be connected in a suitable electric circuit of the engine, with energization thereof controlled by the thermostat switch 61 which, for example, may be a normally closed switch that opens when it senses a predetermined higher temperature.

Accordingly, since such a circuit for the heater element 60 or, the system used to control an oil or gas burner, form no part of the subject invention and such a circuit or system is well known, they need not be described in detail herein.

As is well known, known diesel engines operate with excess air so that normally there will be sufficient excess air in the exhaust gases flowing into the thermal reaction chamber 41 to support secondary combustion. However, it will be apparent that, if required for a particular engine, secondary air can be supplied, as required, to the thermal reaction chamber 41 by means, for example, of an auxiliary blower in a manner well known in the art of air injection reactor systems. The conduit for supplying such secondary air, if required, can readily be incorporated to project through one of the stub shafts 36 or 37. For example, such a secondary air conduit could be run in parallel to the thermostat switch 61 probe element or, alternately, the secondary air could be directly injected into the incoming flow path 40.

During engine operation, exhaust gas from the diesel engine, not shown, enters the regenerative-filter-incinerator device through the inlet 16 into the inlet flow path 40 and then passes radially inward through the filter elements 30 in the upper, with reference to FIG. 1, or inlet flow path half of the cage assembly 11. During this inward passage through the respective filter elements 30, the particulates are removed from the exhaust gases, primarily near the entry or outer peripheral surface of the filter elements and, except immediately after fire-up, heat is added to the exhaust gas by conduction from the filter elements 30.

In the center of the cage assembly 11, that is, in the thermal reactor chamber 41, heat is added, as required, by the heating element 60 to effect secondary combustion and then the exhaust gases pass radially outward through the filter elements 30 in the lower or discharge half of the cage assembly 11. The heated exhaust gases within the thermal reactor chamber 41 raises the temperature of the filter material at least in the entry region of the lower filter elements 30 to a level sufficient to incinerate carboneous particulates previously entrapped by the filter material of the element, this level being more than adequate to burn gaseous hydrocarbons in the exhaust gases. As previously described, the material out of which the filter elements 30 are fabricated may contain or be composed of catalytic materials to enhance the combustion process.

During the radially outward passage of the exhaust gases from the thermal reactor chamber 41 out through the filter elements 30 in the lower half of the device, the exhaust gases loose or give up heat to these filter elements and leave the device through the outlet 17 at a temperature only nominally higher than that of the temperature of the exhaust gas entering through the inlet 16.

As will be apparent, the thus heated filter elements 30 are continuously conveyed by rotation of the cage assembly 11 into the path of the incoming exhaust gases where they loose heat by conduction to the incoming gases. This process is repeated as each filter element passes alternately through the leaving exhaust gas to recover heat and then through the entering exhaust gas flow path to give up the recovered heat. Preferably, the angular velocity of the cage assembly 11 is chosen relative to the thermal capacity of the material of the filter elements 30, such that the amplitude of the temperature variation at any point in a filter element 30 is relatively small over any one rotation of the cage assembly. This will contribute to very high regeneration effectiveness and consequent minimum energy requirement for the device, except during initial warm-up after a cold engine start-up. Preferably, during engine warm-up, the heater element 60 is operated at maximum output or at an output dictated by material temperature limits, as will be apparent to those skilled in the art. After warm-up, the heat input from the heater element 60 need only be a small fraction of the total heat added to the exhaust gases on their inward pass through the device. Actually, depending on the efficiency of the regenerative-heat exchanger, only intermittent operation of the heater may be required to make up for any heat losses from the device.

As will be apparent by reference to FIG. 1, the particulates are collected primarily near the entering surface of the upper filter elements 30, as seen in this figure. The average temperature in this region at the downstream end of the inlet flow path 40 is the lowest in the device and, during part throttle operation of the engine, would be below the required temperature for particulate incineration. However, as previously described, the particulates collected on the filter elements 30 are conveyed by the slow rotation of the filter elements 30 about their axis to the radially inward or hottest portion of the device, that is, to within the thermal reaction chamber 41, where they are incinerated. Preferably, the rotation of the filter elements 30 should be relatively very slow and therefore will have negligible effect on establishing the radial temperature gradient through the filter elements.

Although reference has been made herein that the subject regenerative-filter-incinerator device is intended for use in the exhaust system of a diesel engine, it should be realized that the device of the invention can readily be used with any type engine discharging particulates, as, for example, in engines of the so-called, hybrid, diesel type, that is, an engine using diesel oil but having spark ignition.

It will also be apparent to those skilled in the art that, in certain engine applications, the subject device will, in effect, also function as a muffler to reduce exhaust noise, so that the usual separate muffler may not be needed.

What is claimed is:

1. A regenerative-filter-incinerator, for use in the exhaust system of an internal combustion engine of the type using diesel oil, said regenerative-filter-incinerator including a housing means of substantially drum-shaped configuration having an inlet at one end thereof and an outlet at the opposite end thereof, a hollow, cylindrical, regenerator-filter cage means rotatably supported in said housing, said regenerator filter cage means containing a ring-like arrangement of a plurality of heat exchange-filter means pervious to flow substantially radially therethrough with each of said heat exchange-filter means being supported for independent rotation, said regenerator-filter cage means forming with and dividing said housing means into an inlet flow path for exhaust gases adjacent said inlet and an outlet flow path adjacent said outlet with a reaction chamber substantially defined by the ring-like arrangement of said heat exchange-filter means intermediate therebetween and in flow communication therewith by radial flow through said heat exchange-filter means, drive means operatively connected to said regenerator-filter cage means for effecting rotation thereof at a first predetermined speed, second drive means operatively connected to said heat exchange-filter means to effect rotation thereof at a second predetermined speed and, auxiliary heater means operatively connected to said reaction chamber to supply additional heat to maintain exhaust gases within said reaction chamber at a temperature for secondary combustion, said heat exchange-filter means being operative to heat up incoming exhaust gases flowing through said inlet flow path while filtering out particulates therefrom and to take up heat from the exhaust gases flowing from said reactor chamber into said discharge flow path.

2. A regenerative-filter-incinerator, for use in the exhaust system of a diesel engine, including a housing means of drum-shaped configuration having an inlet and an outlet at opposite ends thereof, a cylindrical, needle bearinglike, cage means rotatably positioned in said housing means, a plurality of porous, heat exchange cylinders rotatably supported by said cage means in ring-like configuration thereabout and defining with said cage means a reaction chamber, said cage means and said heat exchange cylinders forming with and dividing said housing means into an inlet flow path and an outlet flow path with said reactor chamber intermediate therebetween, drive means operatively connected to said cage means for rotating said cage means carrying said heat exchange cylinders at a first predetermined speed of rotation, second drive means operatively associated with each of said heat exchange cylinders to effect independent rotation of each of said heat exchange cylinders relative to said cage means at a second predetermined speed and, auxiliary heater means operatively associated with said reaction chamber to intermittently supply additional heat to said reaction chamber, flow from said inlet flow path to said reaction chamber and from said reaction chamber to said discharge flow path being radially through said heat exchange cylinders, said heat exchange filters when positioned adjacent to said discharge flow path being operable to receive heat as fluid flows therethrough from said reaction chamber into said discharge flow path and then to give up heat to the incoming fluid as it flows from said inlet flow path through said heat exchange cylinders into said reaction chamber, said heat exchange cylinders being operative to filter out particulates from the fluid flowing from said inlet flow path to said reaction chamber and then to carry such particulates to said reaction chamber.

3. A regenerative-filter-incinerator for use in the exhaust system of a diesel engine, said regenerative-filter-incinerator comprising, in combination, a housing having an inlet and an outlet, a cylindrical hollow heat exchange-filter means rotatably positioned in said housing to form with and to divide said housing into an inlet chamber in flow communication with said inlet, an outlet chamber in flow communication with said outlet and an intermediate thermal reactor chamber within said heat exchange-filter in fluid communication with said inlet chamber and said outlet chamber by the flow of fluid from said inlet chamber radially through one side of said heat exchange-filter means into said reactor chamber and then from said reactor chamber radially out the opposite side of said heat exchange-filter means, said heat exchange-filter means including cage means rotatably journaled in said housing, shaft means operatively connected to said cage means whereby said cage means can be rotated in said housing at a predetermined speed, said cage means having equally spaced apart radially extending aperture slots therethrough, a heat exchange-filter element positioned in each of said aperture slots and rotatably supported by said cage means, each said heat exchange-filter element being sufficiently porous to permit the flow of exhaust gases substantially radially therethrough but being operable to filter out soot particles from the exhaust gases, actuating means operatively connected to said housing and to each of said heat exchange-filter elements whereby to effect rotation of each of said heat exchange-filter elements at a predetermined speed relative to said cage means on the rotation of said cage means and, auxiliary heat source means positioned to supply heat to said thermal reactor chamber for igniting the combustible constituents present in the exhaust gases within said thermal reactor chamber and to effect combustion of the soot particles carried into said thermal reactor chamber by said heat exchange-filter elements during the rotation of said heat exchange-filter elements by said actuating means.

4. A regenerative filter-incinerator, for use in the exhaust system of a diesel engine comprising, in combination, a housing having an inlet and an outlet positioned relative to each other to define an inlet flow path and a discharge flow path for the flow of exhaust gases radially through said housing, an annular heat exchange-filter means, rotatably mounted in said housing, drive means operatively connected to said heat exchange-filter means to effect rotation of said heat exchange-filter means at a predetermined speed whereby portions of said heat exchange-filter means passes sequentially first through said inlet flow path and then through said discharge flow path, said housing including spaced apart seals cooperating with said heat exchange-filter means to substantially prevent bypass flow of exhaust gases around said heat exchange-filter means from said inlet flow path to said discharge flow path, said heat exchange-filter means including cage means having first and second annular disk-shaped cage end plates positioned in spaced apart parallel relationship to each other, a plurality of tubular heat exchange-filter elements positioned between and rotatably supported by said cage end plates for rotation therewith, each of said heat exchange-filter elements being in equally spaced apart relationship to the said heat exchange-filter elements on adjacent sides thereof, said cage means further including impermeable seal means extending axially between said cage end plates with each said seal means having semi-circular sides conforming to the outer peripheries of said heat exchange-filter elements to cooperate in sealing relation therewith, each of said heat exchange-filter elements being pervious to the flow of exhaust gases substantially radially therethrough but being operative to filter out soot particles from the exhaust gases flowing through said inlet, said heat exchange-filter elements and said seal means being supported by said end plates so as to define a substantially cylindrical reactor chamber therein, pawl and ratchet means operatively associated with said housing and with each of said heat exchange-filter elements, respectively, to effect rotation of each of said heat exchange-filter elements at a predetermined speed relative to the rotational speed of said heat exchange-filter means, and said heater means projecting into said reactor chamber to supply heat to the exhaust gases flowing therethrough to effect the secondary combustion of these exhaust gases and of the soot particles carried into said reactor chamber by said heat exchange-filter elements as said heat exchange-filter elements are rotated by said pawl and ratchet means.

* * * * *